Figure 1:
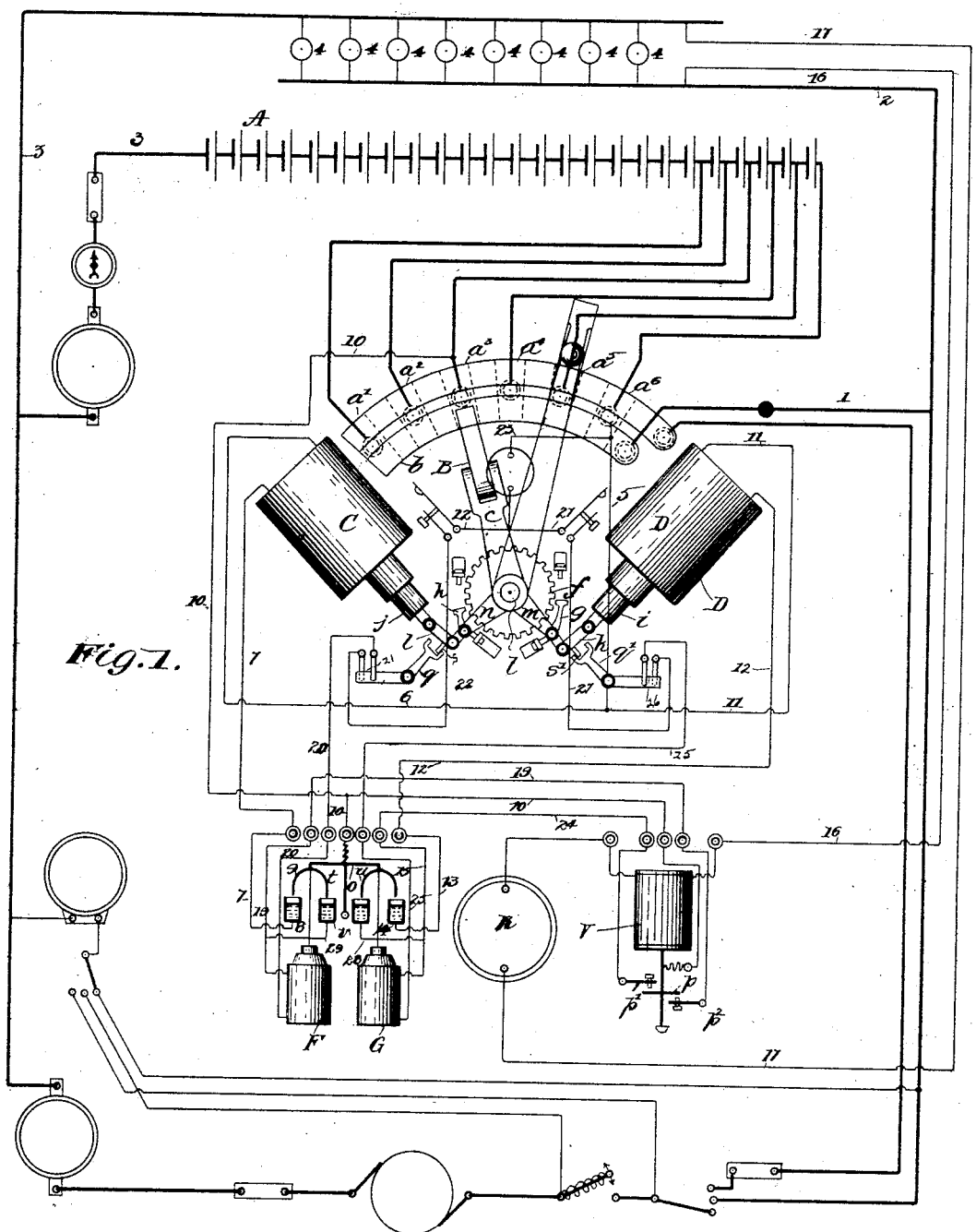

(No Model.)

2 Sheets—Sheet 1.

J. TRUMPY.
STORAGE BATTERY SYSTEM OF DISTRIBUTION.

No. 511,822.

Patented Jan. 2, 1894.

WITNESSES:

INVENTOR
Jakob Trumpy,
BY
ATTORNEYS.

(No Model.) 2 Sheets—Sheet 2.
J. TRUMPY.
STORAGE BATTERY SYSTEM OF DISTRIBUTION.
No. 511,822. Patented Jan. 2, 1894.
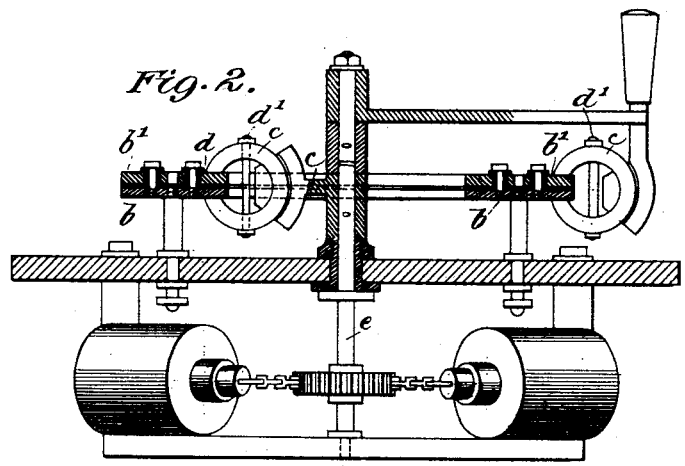
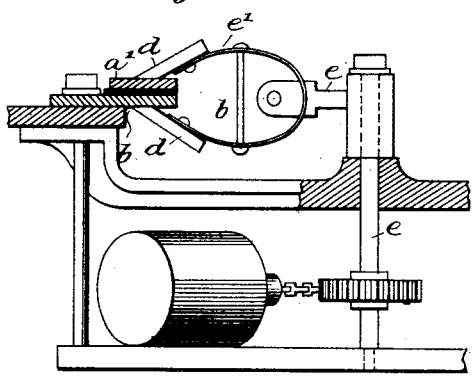
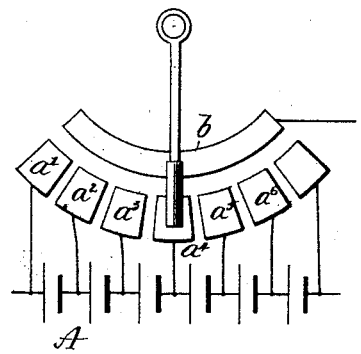
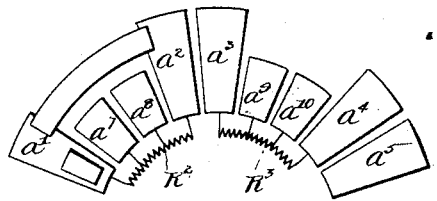
WITNESSES:
INVENTOR
Jakob Trumpy
BY
Briesen & Knauth
ATTORNEYS.

UNITED STATES PATENT OFFICE.

JAKOB TRUMPY, OF HAGEN, GERMANY.

STORAGE-BATTERY SYSTEM OF DISTRIBUTION.

SPECIFICATION forming part of Letters Patent No. 511,822, dated January 2, 1894.

Application filed August 1, 1893. Serial No. 482,057. (No model.) Patented in Germany October 31, 1890, No. 53,870, and July 21, 1892, No. 62,722.

*To all whom it may concern:*

Be it known that I, JAKOB TRUMPY, a subject of the King of Sweden and Norway, residing in Hagen, Westphalia, Germany, have invented an Improvement in Storage-Battery Systems of Distribution, (for which I have received Letters Patent in Germany, No. 53,870, dated October 31, 1890, and No. 62,722, dated July 21, 1892,) of which the following is a specification.

My present invention relates to storage battery systems of distribution, and has for its object to provide an automatically acting means whereby a greater or less number of cells may be included in circuit with the translating devices corresponding with the needs of the circuit. I attain this object by means of the mechanism shown in the accompanying drawings, in which—

Figure 1 is a theoretical diagrammatic view of the circuits and apparatus. Fig. 2 is a detail view partly in transverse vertical section of a modified form of circuit-changing switch. Fig. 3 is a detail view of part of Fig. 1, partly in section. Fig. 4 shows a simple arrangement of contacts that may be used in lieu of the foregoing. Fig. 5 represents a modified arrangement of contacts as will be hereinafter described.

In the drawings A represents storage batteries connected in series and at intervals to contacts $a$ of the circuit-changing switch B. The contacts $a'$ to $a^6$ are mounted on, but insulated from an arc-shaped metallic rail $b$ as shown in section in Fig. 2. To this rail $b$ is connected a conductor 1 which constitutes one terminal of the circuit and to which is connected the main 2. The other main of the system 3 is connected to one terminal of the battery. At suitable points along the mains 2, 3, are connected lamps 4. The circuit of the lamps 4 or other translating devices is completed from the other terminal of the battery to the main 2 through one of the contacts of the switch, the contact arm $c$, rail $b$, to the terminal 1.

In order to include more or less of the battery in circuit it will be necessary to cause the switching arm $c$ with its brushes $d$ to traverse the table of contacts of the circuit-changing switch B, as will be obvious from an inspection of Figs. 1 and 2. This movement of the switching arm is accomplished by means of the rotation of the shaft $e$ upon which it is mounted by means of the pawls $g$ or $h$ acting on the ratchet-wheel $f$ fast on the shaft $e$. The pawls $g$ and $h$ are actuated by means of solenoids C, D, whose cores $i, j$, are connected with the pivoted pawls $g, h$ by means of links $k, l$. The pawls $g, h$, are carried upon the ends of arms $m, n$, which are free to turn on the shaft $e$. It will thus be seen that a retraction of either core $i, j$, will cause its corresponding pivoted pawl to engage the ratchet-wheel $f$ and as the core is sucked into the solenoid, will rock the arm $m$ or $n$ as the case may be, carrying with it the pawl $g$ or $h$, and will move the ratchet-wheel, and consequently the shaft and connected arm $c$ forward one step. The circuit of the solenoid C is completed from the battery contact $a^6$, by means of the wires 5, 6, coil of the solenoid C, wire 7, mercury cup 8, and contact 9, when the latter is drawn down as will be hereinafter explained, wire 10, back to the battery by means of contact $a^3$. The circuit of the other solenoid D is completed by means of wires 5, 11, coil of solenoid D, wires 12, 13, to mercury cup 14, by means of contact 15, when the same is down as will be explained hereinafter, by wire 10, back to contact $a^3$, to battery.

The circuits through the solenoids C D, are closed at 8, 9, or 14, 15, by means of the magnets F or G in the following manner: The contacts 9 and 15 are mounted on a pivoted arm $o$ to which the armatures of the magnets F, G, are connected on opposite sides of the pivot. These magnets lie in separate circuits and may be energized separately to close the circuit through one or the other of the solenoids C, D. The circuit of the magnets F or G is completed by means of any suitable electro responsive device which will respond to variations of potential in circuit, such as a contact volt meter V whose coil is connected to the circuit of the translating devices by means of wires 16, 17. Suitable resistance R may be introduced into the circuit of the coil of the contact volt meter in order to cut down the current to prevent damage to the instrument.

The contact volt meter V may be of any approved construction, but the one that I have illustrated as suitable for the purpose consists of a solenoid having suspended within it a core carrying the contact piece $p$ which plays between contact pieces $p'$ and $p^2$. The coil and core are so relatively proportioned that when the normal current is flowing in the mains to which the coil is connected, the core will be held up in such a position that the contact piece $p$ will be intermediate of and out of contact with either $p'$ or $p^2$.

The contact volt meter V completes the circuit of either of the magnets F, G, in the following manner: When the contact pieces $p$ and $p^2$ are in contact, the current will come from the battery by means of wire 10 to the contact piece $p$, thence to $p^2$ and by means of the wire 19 to and through the magnet F, thence by means of wire 20 to the circuit-breaker 21, by wires 22 and 23, back to battery, through the contact $a^6$. This will have the effect of rocking the arm $o$ and dipping the contact 9 into the mercury cup 8, which, as before explained, will close the circuit of the solenoid C and cause the core to be drawn into the coil. The circuit-breaking arm $q$ will be rocked on its pivot $r$ by means of the stud $s$ on the link $l$. This will break the circuit of the magnet F at 21, and cause the magnet to release its armature. When the armature has been released the circuit of the magnet C will be broken at 8, 9, and the core will be returned to its normal position by gravity or by means of a spring. The circuit of the magnet G is closed in a similar manner by the contact pieces $p$ $p'$, (the current coming thereto from the battery by wire 10,) through the wire 24, coil of magnet G, by wire 25, circuit-breaker 26, wires 27 and 23, to battery by contact $a^6$. The core $i$ of the solenoid D operates upon the ratchet-wheel $f$ in the same manner as is done by solenoid C, by means of arm $m$, pivoted pawl $g$, link $k$, stud $s'$, circuit-breaking arm $q'$, pivoted at $r'$ and operating to break the circuit of the magnet G at 26, in the same manner as is done by the circuit-breaking arm at 21.

It will be seen that as long as the circuit is closed at $p'$, $p^2$, the ratchet-wheel will be given a step by step movement, since upon each return movement of the core the circuit of the magnet F or G, as the case may be, is again closed at 21 or 26. As long as the circuit of the magnet F or G is closed by the contact volt meter, it will be apparent that the solenoids C or D will be intermittently operated to give a step by step movement to the ratchet-wheel $f$ and shaft $e$.

It will be seen that the device may form an efficient regulator for the tension on line by automatically switching in a greater or less number of storage batteries to compensate for the varying conditions of the translating devices on the line circuit.

Any change of the tension on line will be communicated to the contact volt meter and if sufficiently great to produce ill-effects in the translating devices, will cause the contact volt meter to close-circuit between the contacts $p'$ and $p$, or $p$ and $p^2$. We will suppose that for some reason the tension of the current in the mains is not high enough to properly feed the translating devices. In this case the magnetism of the form of volt meter which I have indicated, consisting of the solenoid and core, will not be great enough to sustain the core in the position illustrated, and will allow it to drop and to close contact between $p$ and $p^2$. This will, as before explained, close the circuit of magnet F and cause it to rock the arm $o$ and close the circuit of the solenoid C and step the ratchet-wheel $f$ around to the right, the step by step action continuing as before explained as long as the circuit of the magnet F is closed by the contact volt meter. As the ratchet-wheel and shaft revolve, the arm $c$ will be caused to travel over the circuit-changing switch to the right and cut in more battery. This will, as is well known, have the effect of raising the tension of the line current, and as soon as this tension has been raised to normal the core will be raised to its normal position, and the contacts $p$, $p^2$ separated. This will break the circuit of the magnet F and the apparatus will come to rest. Any increase of tension of the line will close the circuit of the magnet G at $p$ and $p'$, and cause it to energize the solenoid D which, by means of its core and adjunctive devices, will step the wheel $f$ around to the left and cut out battery until the tension of the line current has been reduced to normal. The apparatus will then come to rest as before.

It may frequently happen that the contact made by the contact volt meter will be weak, and the resistance of such weak contact may be too great to allow sufficient current to flow in the circuit of the magnets F or G to magnetize them. To obviate this difficulty I have provided for each set of contacts an automatic short circuit so that instead of taking the high resistance path through the contacts of the volt meter, the current from the battery will pass over the short circuit, and will properly energize the magnets F or G to cause them to operate the circuit closer. To this end I have provided on each end of the arm $o$ a contact $t$, $u$, which dip into mercury cups $v$, $w$, respectively. These contacts and mercury cups serve to short circuit the points of the contact volt meter. These short circuits are completed as soon as either end of the arm $o$ has been drawn down by its appropriate magnet, and the contacts on the end thereof dipped into the mercury cups. The path of the short-circuit for the contacts $p$ $p'$ is completed from wire 24 by wire 28, mercury cup $w$, contact $u$, arm $o$ and wire 10. The short circuit for the contacts $p$ $p^2$ is completed from wire 19 by wire 29, mercury cup $v$, contact $t$, arm $o$ to wire 10. It will thus be obvious that no matter how weak the contact at the contact volt meter be, the short circuit will be brought into action and will insure the operation of the switching device. It will be understood that the magnets F and G are wound to respond to passage of a current of very low volume.

In Fig. 2 I have shown a modified arrangement of the circuit-changing switch. In this instance the contacts $a'$ to $a^6$ are mounted on a metallic rail $b$, but insulated therefrom, and are further supplemented by additional contacts $b'$ mounted upon the rail $b$ and insulated therefrom in a similar manner. The contact pieces $c'$ are made in form of rings mounted on the arm $c$ embracing the rail and contact, and bearing thereon to form a bridging conductor between said rail and contact. The bolt $d'$ serves to press the ends of the contact pieces firmly in contact with the ring and contact piece.

In Fig. 3 I have shown the arrangement of contact pieces of Fig. 1 as consisting of a bow-spring $e'$ mounted on the arm $c$ and held under tension by a tie bolt $f'$. The contact pieces $d$ are mounted on the ends of the bow-spring and are pressed firmly upon the rail and contact piece. In addition to serving to hold the contact pieces $d$ $d$ firmly in engagement with the rail in contact, the bow-spring $e'$ also serves as a conductor for the current between the contact pieces $d$ $d$.

In Fig. 4 I have shown a very simple form of connection for the circuit-changer which may be used to replace the devices shown in Figs. 1, 2, and 3.

In Fig. 5 I have shown a system of bridging resistance coils $R^2$, $R^3$ connecting adjacent contacts $a'$, $a^2$, $a^3$ and $a^4$. Between these contacts $a'$, $a^2$, $a^3$, $a^4$, I place supplemental contacts $a^7$, $a^8$, $a^9$, $a^{10}$ to which the bridging coils are also connected so that in traveling from one pair of contacts to another the circuit is maintained continuous, except for the very short space of time when the brush is passing over the intervening space.

It will be obvious that the arrangement and construction of circuits and apparatus may be varied without departing from the spirit of my invention. I do not, therefore, limit myself to the exact devices herein shown nor to any specific devices for accomplishing the automatic switching of storage batteries in response to the needs of the external circuit or the load on the machine, as it is obvious that the devices may be greatly varied without departing from my invention or any change may be made therein which would be obvious to a skilled mechanic.

Having described my invention, what I claim, and desire to secure by Letters Patent, is—

1. In a storage battery system of distribution the combination of storage batteries having translating devices in circuit therewith, a circuit changer for completing the circuit of the batteries and translating devices and switching a greater or less number of batteries in circuit, a motor operated during a closure of its circuit to impart a movement to the circuit changer, and means for maintaining the motor circuit continuous during a predetermined movement of the motor, substantially as described.

2. In a storage battery system of distribution, the combination of storage batteries having translating devices included in circuit therewith, a circuit-changer for completing the circuit of the batteries and translating devices, having a table of contacts to which the cells of battery are connected at intervals and a switching arm engaging therewith, an electro-magnetic step by step motor automatically operated during a closure of its circuit to impart a step by step movement to the switching arm, and means for maintaining the motor circuit continuous during a predetermined movement of the motor, substantially as described.

3. In a storage battery system of distribution, the combination of storage batteries having translating devices included in circuit therewith, a circuit-changer for completing the circuit between the batteries and translating devices having a table of contacts to which the cells of battery are connected at intervals and a switching arm engaging therewith, an electro-magnetic step by step motor automatically operated during a closure of its circuit to impart a step by step movement to the switching arm, an electro-magnetic circuit-closer in the battery circuit operated by a change of potential in said battery circuit to close the circuit through the step by step device, and means for short-circuiting the contacts of the electro-magnetic circuit-closer during a predetermined movement of the motor, substantially as described.

4. In a storage battery system of distribution, the combination with a circuit changing switch adapted to alter the number of cells in circuit, of an electro-magnetic step by step motor therefor, automatically operated during a closure of its circuit to actuate the circuit changing switch, an electro-magnetic circuit-closer controlled by the potential in the battery circuit and operating to close circuit through the motor, and a short-circuit around the contacts of the electro-magnetic circuit-closer which is broken by the movement of the motor, substantially as described.

5. In a storage battery system of distribution, the combination with a circuit-changing switch adapted to alter the number of cells in circuit, of an electro-magnetic step by step motor therefor, automatically operated during a closure of its circuit to actuate the circuit-changing switch, an electro-magnetic circuit closer controlled by the potential in the battery circuit and operating to close circuit through the motor, and a short circuit around the contacts of the electro-magnetic circuit closer which is alternately made and broken by the movement of the motor, substantially as described.

6. In a switch or circuit-changer, the combination of a suitably supported circular conducting rail, contacts mounted thereon, but insulated therefrom, a contact brush bridging said rail and contacts, an arm carrying said contact brush, and rigidly mounted on a spindle, and an electro-magnetic step by step device engaging said spindle to rotate it step by step and circuit connections therefor, substantially as described.

7. In a switch or circuit-changer, the combination of a table of contacts, bridging resistance coils connecting adjacent pairs of contacts, and intermediate auxiliary contacts connected to the bridging coils, substantially as described.

8. In a switch or circuit changer, the combination of a suitably supported circular conducting rail, contacts mounted thereon, but insulated therefrom, a contact brush bridging said rail and contacts, and an arm carrying said contact brush mounted on a spindle, substantially as described.

JAKOB TRUMPY.

Witnesses:
GEO. E. MORSE,
HARRY M. TURK.